United States Patent
Bhaya et al.

(10) Patent No.: US 10,957,326 B2
(45) Date of Patent: Mar. 23, 2021

(54) DEVICE IDENTIFIER DEPENDENT OPERATION PROCESSING OF PACKET BASED DATA COMMUNICATION

(71) Applicant: Google LLC, Mountain View, CA (US)

(72) Inventors: Gaurav Bhaya, Sunnyvale, CA (US); Robert Stets, Mountain View, CA (US); Justin Lewis, Marina Del Rey, CA (US); Ruxandra Davies, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 99 days.

(21) Appl. No.: 15/966,587

(22) Filed: Apr. 30, 2018

(65) Prior Publication Data

US 2018/0247654 A1  Aug. 30, 2018

Related U.S. Application Data

(63) Continuation-in-part of application No. 15/395,674, filed on Dec. 30, 2016, now Pat. No. 10,437,928.

(51) Int. Cl.
*G06F 16/00* (2019.01)
*G10L 15/26* (2006.01)
(Continued)

(52) U.S. Cl.
CPC .............. *G10L 15/26* (2013.01); *G06F 3/167* (2013.01); *G06F 40/205* (2020.01); *G10L 15/22* (2013.01);
(Continued)

(58) Field of Classification Search
CPC combination set(s) only.
See application file for complete search history.

(56) References Cited

U.S. PATENT DOCUMENTS

| | | |
|---|---|---|
| 6,275,806 B1 | 8/2001 | Pertrushin |
| 6,684,249 B1 | 1/2004 | Frerichs et al. |

(Continued)

FOREIGN PATENT DOCUMENTS

| | | |
|---|---|---|
| EP | 2 317 709 | 5/2011 |
| JP | 2008-226148 | 9/2008 |

(Continued)

OTHER PUBLICATIONS

Buckland et al., "Amazon's Alexa Takes Open-Source Route to Beat Google Into Cars", Bloomberg, Feb. 27, 2018, 6 pages.

(Continued)

*Primary Examiner* — Farhan M Syed
(74) *Attorney, Agent, or Firm* — Foley & Lardner LLP

(57) ABSTRACT

Identifier dependent operation processing of packet based data communication is provided. A natural language processor component can parse an input audio signal to identify a request and a trigger keyword. A content selector component can select, based on the request or trigger keyword, a content item. A link generation component can determine whether the client computing device has an account or a record in a database associated with the service provider device. In the absence of the record or account, the link generation device generates and sends a virtual identifier to the service provider device with instructions to generate an account in the database using the virtual identifier. Once the account is created, the service provider device can communicate with the client computing device.

20 Claims, 6 Drawing Sheets

| Identifier | Client computing device identifier | Client computing device address | Conversion Information | New account | | Identifier | Content item or service | Start address | Destination address | Requested time | Conversion Information |
|---|---|---|---|---|---|---|---|---|---|---|---|

200  202

(51) Int. Cl.
*G06F 3/16* (2006.01)
*G10L 15/22* (2006.01)
*G06F 40/205* (2020.01)
*G06F 40/279* (2020.01)

(52) U.S. Cl.
CPC ...... *G06F 40/279* (2020.01); *G10L 2015/223* (2013.01)

(56) References Cited

U.S. PATENT DOCUMENTS

| | | | |
|---|---|---|---|
| 6,857,007 | B1 | 2/2005 | Bloomfield |
| 7,853,255 | B2 | 12/2010 | Karaoguz et al. |
| 8,056,122 | B2* | 11/2011 | Cho ................. G06F 21/34 726/5 |
| 8,195,133 | B2 | 6/2012 | Ramer et al. |
| 8,386,386 | B1 | 2/2013 | Zhu |
| 8,903,716 | B2 | 12/2014 | Chen et al. |
| 9,280,973 | B1* | 3/2016 | Soyannwo ............. G10L 15/22 |
| 2003/0007188 | A1 | 1/2003 | Hoshino et al. |
| 2005/0165698 | A1* | 7/2005 | Cho ................. H04L 63/08 705/67 |
| 2007/0097975 | A1 | 5/2007 | Rakers et al. |
| 2007/0127688 | A1 | 6/2007 | Doulton |
| 2012/0265528 | A1 | 10/2012 | Gruber et al. |
| 2013/0117022 | A1 | 5/2013 | Chen et al. |
| 2013/0275164 | A1 | 10/2013 | Gruber et al. |
| 2013/0304758 | A1 | 11/2013 | Gruber et al. |
| 2014/0222436 | A1 | 8/2014 | Binder et al. |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0358301 | A1 | 12/2017 | Raitio et al. |

FOREIGN PATENT DOCUMENTS

| | | |
|---|---|---|
| JP | 2009-048446 A | 3/2009 |
| JP | 2015-090620 A | 5/2015 |
| JP | 2015-108903 | 6/2015 |
| WO | WO-2013/001573 | 1/2013 |

OTHER PUBLICATIONS

Communication pursuant to Article 94(3) EPC for EP Application No. 17771621.4 dated Nov. 23, 2018, 8 pages.
International Preliminary Report on Patentability for PCT/US2017/049738 dated Mar. 28, 2019, 10 pages.
Korean Office Action for Application No. 10-2017-7031463 dated Jan. 17, 2019, 13 pages.
Notice of Reasons for Rejection for JP Application No. 2017-556889 dated Feb. 18, 2019, 2 pages.
U.S. Non-Final Office Action for U.S. Appl. No. 15/395,674 dated Jan. 25, 2019, 16 pages.
U.S. Notice of Allowance for U.S. Appl. No. 15/395,674 dated May 31, 2019, 9 pages.
Written Opinion of the International Preliminary Examining Authority for PCT/US2017/049738 dated Jan. 11, 2019, 9 pages.
"Shop Walmart and more of your favorite stores, faster" https://blog.google/products/assistant/shop-walmart-and-more-your-favorite-stores-faster/.
"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Chen, Lulu Yilun, "Alibaba Challenges Google, Amazon With New Echo-Like Device", Bloomberg Technology, Jul. 5, 2017 (3 pages).
Close, "Amazon Echo Will Give you These Deals If You Order Through Alexa This Weekend," Web Article, Nov. 19, 2016, Time.com (2 pages).
Clover, Juli, "Amazon and Google Want to Turn Their Smart Home Speakers Into Telephone Replacements", Feb. 15, 2017, 9 pages.
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be 'bridge' between Amazon Alex, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from http://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Search Report and Written Opinion for PCT Appl. Serial No. PCT/US2017/049738 dated Dec. 11, 2017, 13 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.

(56) References Cited

OTHER PUBLICATIONS

Larson, Selena "Google Home Now Recognizes Your Individual Voice" Apr. 20, 2017, 6 pages.
Lee, "Take Two for Samsung's troubled Bixby assistant", BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can Tell You How Much That's Worth",CBS Interactive, Inc. 3 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, $201CSamsung$2019s new virtual assistant will make using your phone easier$201D, The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017 (5 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
Examination Report for IN Appln. Ser. No. 201747039625 dated Jun. 26, 2020 (5 pages).
First Office Action for CN Appln. Ser. No. 201780001350.1 dated Jul. 23, 2020 (23 pages).
Notice of Allowance for JP Appln. Ser. No. 2019-131863 dated Sep. 7, 2020 (5 pages).
Extended European Search Report for EP Appln. U.S. Ser. No. 20180386.3 dated Oct. 19, 2020 (8 pages).

* cited by examiner

FIG. 2A — 200: Identifier | Client computing device identifier | Client computing device address | Conversion Information | New account

FIG. 2B — 202: Identifier | Content item or service | Start address | Destination address | Requested time | Conversion Information

FIG. 2C — 204: Identifier | GPS Data | Noise level | Cell Signal Stregth | Temperature

DEVICE IDENTIFIER DEPENDENT OPERATION PROCESSING OF PACKET BASED DATA COMMUNICATION

CROSS-REFERENCES TO RELATED APPLICATIONS

This application claims the benefit of priority under 35 U.S.C. § 120 as a continuation-in-part of U.S. patent application Ser. No. 15/395,674, filed Dec. 30, 2016, which is hereby incorporated herein by reference in its entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

At least one aspect is directed to a system to provide identifier dependent operation processing of packet based data communication. The system includes a natural language processor component executed by a data processing system to receive, via an interface of the data processing system, data packets comprising an input audio signal detected by a sensor of a client computing device having a device identifier. The natural language processor component parses the input audio signal to identify a request and a trigger keyword corresponding to the request. The system further includes a content selector component executed by the data processing system to receive the trigger keyword identified by the natural language processor and to select, based on the trigger keyword, a content item via a real-time content selection process. The system also includes a link generation component to perform a lookup of a device identifier of the client computing device in a database storing account identifiers established for a service provider device corresponding to the content item. The system further includes the link generation component to determine an absence of the device identifier of the client computing device in the database based on a null command received in response to the lookup. The system further includes the link generation component to generate, a virtual identifier for the client device and link the virtual identifier to the device identifier, and to route data packets that carry, in a payload section, the virtual identifier to service provider device to cause the service provider device to establish an account for the client computing device based on the virtual identifier. The system also includes the data processing system to receive, from the service provider device, an indication that the service provider device established the account using the virtual identifier, and performed an operation with the client computing device.

At least one aspect is directed to a method to invoke actions for identifier dependent operation processing of packet data communication between a client computing device and a service provider device using a data processing system. The method includes receiving, by a natural language processor component executed by the data processing system, from the client computing device an audio signal corresponding to a voice command. The method further includes processing, by the natural language processor component, the audio signal to identify a request for a service and a trigger keyword corresponding to the request. The method also includes selecting, by a content selector component executed by the data processing system, based on the keyword, a content item corresponding to the service provider device communicably coupled to the data processing system. The method additionally includes determining, by a link generation component executed by the data processing system, an absence of a database record corresponding to a client computing device identifier associated with the client computing device in a database associated with the service provider device. The method further includes generating, by the link generation component responsive to determining the absence, a virtual identifier associated with the client computing device, the virtual identifier being distinct from the client computing device identifier. The method also includes sending, by the link generation component, the virtual identifier to the service provider device. The method additionally includes receiving, by the link generation component, a first message from the service provider device indicating establishment of a database record corresponding to the virtual identifier.

At least one aspect is directed to a computer readable storage medium storing instructions that when executed by one or more data processors, cause the one or more data processors to perform operations for identifier dependent operation processing of packet based data communication between a client computing device and a service provider device. The operations can receive, by a natural language processor component executed by the data processing system, from the client computing device, an audio signal corresponding to a voice command. The operations can process, by the natural language processor component, the audio signal to identify a request for a service and a trigger keyword corresponding to the request. The operations can select by a content selector component executed by the data processing system, based on the keyword, a content item corresponding to the service provider device communicably coupled to the data processing system. The operations can determine by a link generation component executed by the data processing system, an absence of a database record corresponding to a client computing device identifier associated with the client computing device in a database associated with the service provider device. The operations can generate by the link generation component responsive to determining the absence, a virtual identifier associated with the client computing device, the virtual identifier being distinct from the client computing device identifier. The operations can send by the link generation component, the virtual identifier to the service provider device. The operations can receive by the link generation component, a first message from the service provider device indicating establishment of a database record corresponding to the virtual identifier.

At least one aspect is directed to a system to reduce network communications between devices to process an operation. The system can include a data processing system. The data processing system can include one or more processors and memory. The data processing system can include a natural language processor, content selector component, and link generation component. The natural language processor component can receive, via an interface of the data processing system, data packets comprising an input audio signal detected by a sensor of a client computing device having a device identifier. The natural language processor component can parse the input audio signal to identify a request and one or more keywords corresponding to the request. The content selector component can receive the one or more keywords identified by the natural language processor. The content selector component can select, based on the one or more keywords, a digital component via a real-time content selection process. The link generation component can receive a null command responsive to a second request to access a resource for the client computing device. The link generation component can generate, responsive to the null command, a token for the client computing device. The data processing system can route data packets having the token to a service provider device to cause the service provider device to process the data packets. The data processing system can receive, from the service provider device, an indication that the service provider device processed, via the token, the data packets to perform an operation.

At least one aspect is directed to a method of reducing network communications between devices to process an operation. The method can be performed by a data processing system comprising one or more processors. The method can include the data processing system receiving, via an interface of the data processing system, data packets comprising an input audio signal detected by a sensor of a client computing device having a device identifier. The method can include the data processing system parsing the input audio signal to identify a request and one or more keywords corresponding to the request. The method can include the data processing system receiving the one or more keywords identified by the natural language processor. The method can include the data processing system selecting, based on the one or more keywords, a digital component via a real-time content selection process. The method can include the data processing system receiving a null command responsive to a second request to access a resource for the client computing device. The method can include the data processing system generating, responsive to the null command, a token for the client computing device. The method can include the data processing system routing data packets having the token to a service provider device to cause the service provider device to process the data packets. The method can include the data processing system receiving, from the service provider device, an indication that the service provider device processed, via the token, the data packets to perform an operation.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 2A-2C depict representations of data structures used by a data processing system to send information to a service provider device.

DETAILED DESCRIPTION

Figure 1:
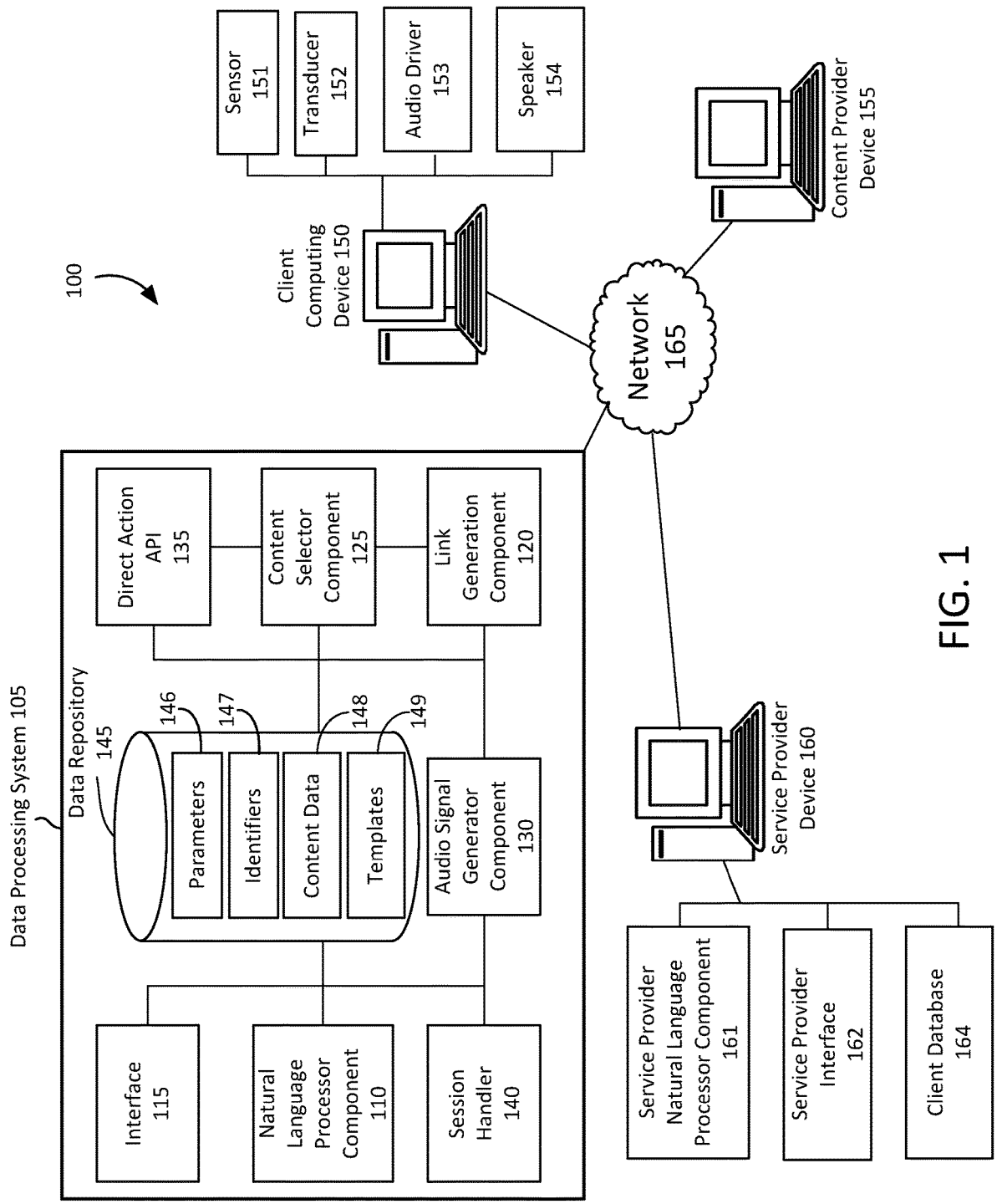
FIG. 1 depicts a system to optimize processing of sequence dependent operations in a voice activated computer network environment.

Following below are more detailed descriptions of various concepts related to, and implementations of, methods, apparatuses, and systems to optimize processing of sequence dependent operations in a voice activated computer network environment. The various concepts introduced above and discussed in greater detail below may be implemented in any of numerous ways.

Systems and methods of the present disclosure relate generally to a data processing system that improves the efficiency, reliability, and operability of data packet transmissions between a client computing device and a service provider device in a voice activated computer network environment. For example, the data processing system can facilitate a creation of records or accounts associated with the client computing device in a database of the service provider device such that the service provider device can communicate with, and provide requested services to, the client computing device. The creation of records or accounts on behalf of the client computing device also improves efficiency and reduces resource use by avoiding the need for communication between the service provider device and the client computing device to establish a record or account prior to providing a requested service. Data packets or other protocol based signals corresponding to the selected operations can be routed through a computer network between multiple computing devices. The data processing system can receive audio signals representing user commands or requests, and identify specific requests and keywords. Based on the requests or keywords, the data processing system can present the client computing device with content items that represent alternative service options. The data processing system can determine whether the computing device has selected the alternative service option and further determine whether the service provider device associated with the alternative service option includes a record or an account associated with the client computing device. The absence of a record or an account may prevent the service provider device from communicating with, and providing the requested services to, the client computing device.

To improve the efficiency, reliability, and operability of data packet transmissions between a client computing device and a service provider device in a voice activated computer network environment, systems and methods described herein can include a data processing system that, upon detecting an absence of a record or an account associated with the client computing device with the service provider device, can establish a data packet based communication session on behalf of the client computing device and instruct the service provider device to create an account without any intervention from the client computing device. The data processing system can generate virtual identifiers (or virtual tokens), representing the client computing device, that can be sent to the service provider devices to generate records or accounts. Once the record or the account for the client computing device has been created, the service provider is able to establish secure communications with the client computing device and provide the requested service.

FIG. 1 depicts an example system 100 to optimize processing of sequence dependent operations in a voice activated data packet (or other protocol) based computer network environment. The system 100 can include at least one data processing system 105. The data processing system 105 can include at least one server having at least one processor. For example, the data processing system 105 can include a plurality of servers located in at least one data center or server farm. The data processing system 105 can determine, from an audio input signal a request and a trigger keyword associated with the request. Based on the request and trigger keyword the data processing system 105 can determine or select a thread that includes a plurality of sequence dependent operations, and can select content items (and initiate other actions as described herein). The content items can include one or more audio files that when rendered provide an audio output or acoustic wave. The content items can include other content (e.g., text, video, or image content) in addition to audio content.

The data processing system 105 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 105 can include servers in a data center that are stored in one or more high-density rack systems, along with associated storage systems, located for example in an enterprise data center. The data processing system 105 with consolidated servers in this way can improve system manageability, data security, the physical security of the system, and system performance by locating servers and high performance storage systems on localized high performance networks. Centralization of all or some of the data processing system 105 components, including servers and storage systems, and coupling them with advanced system management tools allows more efficient use of server resources, which saves power and processing requirements and reduces bandwidth usage.

The data processing system 105 can include at least one natural language processor (NLP) component 110, at least one interface 115, at least one link generation component 120, at least one content selector component 125, at least one audio signal generator component 130, at least one direct action application programming interface (API) 135, at least one session handler component 140, and at least one data repository 145. The NLP component 110, interface 115, link generation component 120, content selector component 125, audio signal generator component 130, direct action API 135, and session handler component 140 can each include at least one processing unit, server, virtual server, circuit, engine, agent, appliance, or other logic device such as programmable logic arrays configured to communicate with the data repository 145 and with other computing devices (e.g., the client computing device 150, the content provider computing device 155, or the service provider device 160) via the at least one computer network 165. The direct action API 135 can execute a specified action to satisfy an intention of a user at the client computing device 150, as determined by the data processing system 105. Depending on the action specified in its inputs, the direct action API 135 can execute code or a dialog script that identifies the parameters required to fulfill a user request. Such code can lookup additional information, e.g., in the data repository 145, such as the name of a home automation service, or it can provide audio output for rendering at the client computing device 150 to ask the end user questions such as the intended destination of a requested taxi. The direct action API 135 can determine necessary parameters and can package the information into an action data structure, which can then be sent to another component such as the content selector component 125 or to the service provider computing device 160 to be fulfilled.

The network 165 can include computer networks such as the internet, local, wide, metro or other area networks, intranets, satellite networks, other computer networks such as voice or data mobile phone communication networks, and combinations thereof. The network 165 can include or constitute a display network, e.g., a subset of information resources available on the internet that are associated with a content placement or search engine results system, or that are eligible to include third party content items as part of a content item placement campaign. The network 165 can be used by the data processing system 105 to access information resources such as web pages, web sites, domain names, or uniform resource locators that can be presented, output, rendered, or displayed by the client computing device 150. For example, via the network 165 a user of the client computing device 150 can access information or data provided by the content provider computing device 155 or the service provider device 160.

The network 165 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 165 can include a wireless link, such as an infrared channel or satellite band. The topology of the network 165 may include a bus, star, or ring network topology. The network 165 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 150, the content provider computing device 155, and the service provider device 160 can each include at least one logic device such as a computing device having a processor to communicate with each other or with the data processing system 105 via the network 165. The client computing device 150, the content provider computing device 155, and the service provider device 160 can each include at least one server, processor or memory, or a plurality of computation resources or servers located in at least one data center. The client computing device 150, the content provider computing device 155, and the service provider device 160 can each include at least one computing device such as a desktop computer, laptop, tablet, personal digital assistant, smartphone, portable computer, thin client computer, virtual server, or other computing device.

The client computing device 150 can include at least one sensor 151, at least one transducer 152, at least one audio driver 153, and at least one speaker 154. The sensor 151 can include a microphone or audio input sensor. The transducer 152 can convert the audio input into an electronic signal. The audio driver 153 can include a script or program executed by one or more processors of the client computing device 150 to control the sensor 151, the transducer 152 or the audio driver 153, among other components of the client computing device 150 to process audio input or provide audio output. The speaker 154 can transmit the audio output signal. The computing device 150 may or may not include a display; for example, the computing device may include limited types of user interfaces, such as a microphone and speaker. In some cases, the primary user interface of the computing device 150 may be a microphone and speaker.

The client computing device 150 can be associated with an end user that enters voice queries as audio input into the client computing device 150 (via the sensor 151) and receives audio output in the form of a computer generated voice that can be provided from the data processing system 105 (or the content provider computing device 155 or the service provider device 160) to the client computing device 150, output from the speaker 154. The computer generated voice can include recordings from a real person or computer generated language.

The content provider computing device 155 can provide audio based content items for display by the client computing device 150 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 155 can also provide audio based content items (or other content items) to the data processing system 105 where they can be stored in the data repository 145. The data processing system 105 can select the audio content items and provide (or instruct the content provider computing device 155 to provide) the audio content items to the client computing device 150. The audio based content items can be exclusively audio or can be combined with text, image, or video data.

The service provider device 160 can include at least one service provider natural language processor (NLP) component 161 and at least one service provider interface 162. The service provider NLP component 161 (or other components such as a direct action API of the service provider device 160) can engage with the client computing device 150 (via the data processing system 105 or bypassing the data processing system 105) to create a back-and-forth real-time voice or audio based conversation (e.g., a session) between the client computing device 150 and the service provider device 160. For example, the service provider interface 162 can receive or provide data messages to the direct action API 135 of the data processing system 105. The service provider device 160 and the content provider computing device 155 can be associated with the same entity. For example, the content provider computing device 155 can create, store, or make available content items for a car sharing service, and the service provider device 160 can establish a session with the client computing device 150 to arrange for a delivery of a taxi or car of the car share service to pick up the end user of the client computing device 150. The data processing system 105, via the direct action API 135, the NLP component 110 or other components can also establish the session with the client computing device 150, including or bypassing the service provider device 160, to arrange for example for a delivery of a taxi or car of the car share service.

The data repository 145 can include one or more local or distributed databases, and can include a database management system. The data repository 145 can include computer data storage or memory and can store one or more parameters 146, one or more identifiers 147, content data 148, or templates 149 among other data. The parameters 146, identifiers 147, and templates 149 can include information such as rules about a voice based session between the client computing device 150 and the data processing system 105 (or the service provider device 160). The identifiers 147, in particular, can include data associated with an identity of the client computing device 150 or an identity of a user of the client computing device 150. The identifiers 147 also can include one or more unique identifiers (also referred to herein as virtual identifiers or virtual tokens) generated by the data processing system 105 and associated with the client computing device 150 or the user of the client computing device 150. The content data 148 can include content items for audio output or associated metadata, as well as input audio messages that can be part of one or more communication sessions with the client computing device 150.

The data processing system 105 can include an application, script or program installed at the client computing device 150, such as an app to communicate input audio signals to the interface 115 of the data processing system 105 and to drive components of the client computing device 150 to render output audio signals. The data processing system 105 can receive data packets or other signal that includes or identifies an audio input signal. For example, the data processing system 105 can execute or run the NLP component 110 to receive the audio input signal. The NLP component 110 can convert the received audio input signal into recognized text by comparing the audio input signal against a stored, representative set of audio waveforms and choosing the ones that are a closest match. The representative waveforms are generated across a large set of users, and may be augmented with speech samples from the user. After the received audio input signal is converted into recognized text, the NLP component 110 matches the text to words that are associated, for example, via training across users or through manual specification, with actions or commands that the data processing system 105 can serve. The audio input signal can be detected by the sensor 151 (e.g., a microphone) of the client computing device 150. Via the transducer 152, the audio driver 153, or other components the client computing device 150 can provide the audio input signal to the data processing system 105 (e.g., via the network 165) where it can be received (e.g., by the interface 115) and provided to the NLP component 110 or stored in the data repository 145 as content data 148.

The NLP component 110 can obtain the input audio signal. From the input audio signal, the NLP component 110 can identify at least one request or at least one trigger keyword corresponding to the request. The request can indicate intent or subject matter of the input audio signal. The trigger keyword can indicate a type of action likely to be taken. For example, the NLP component 110 can parse the input audio signal to identify at least one request to leave home for the evening to attend dinner and a movie. The trigger keyword can include at least one word, phrase, root or partial word, or derivative indicating an action to be taken. For example, one or more of trigger keywords, such as "ride," "cab," or "taxi" identified from the input audio signal can indicate a need for transport. In another example, one or more keywords such as "go," or "to go to," identified from the input audio signal also may indicate a need for transport. In this example, the input audio signal (or the identified request) does not directly express an intent for transport, however the trigger keyword indicates that transport is an ancillary action to at least one other action that is indicated by the request.

The data processing system 105 can determine, based on the request or the trigger keyword, at least one thread associated with the input audio signal. The thread can indicate a set of sequence dependent operations, such as a series of actions. The thread can include any two or more actions, such as a first action, a second action, and a third action. For example, the input audio signal "OK, I would like to go to go dinner and then a movie tonight" can include at least one request indicating an interest to attend dinner and a movie, and at least one trigger keyword, e.g., "go" indicating a need for transportation. The data processing system 105 can identify a thread with at least three actions, such as a dinner action (first action), a movie action (second action), and a transportation home action (third action). In this example, from the request or the trigger keyword the data processing system 105 predicts, estimates, or otherwise determine the three actions. The thread can include other actions, such as an initial transport to dinner action.

The content selector component 125 can obtain indications of any of the actions of the thread. For example, the content selector component 125 can receive an indication of the third (or any other) action identified by the data processing system. The content selector component 125 can obtain this information from the data repository 145, where it can be stored as part of the content data 148. The indication of the third action can inform the content selector component 125 of a need for transportation from the location of the movie theater to a location as determined or indicated by the client computing device 150, such as a ride to an end destination.

From the information received by the content selector component 125, the content selector component 125 can identify at least one content item. The content item can be responsive or related to the third action. For example, the content item can include an audio message offering services of a car share company, responsive to the third action that indicates a transportation need. The content selector component 125 can query the data repository 145 to select or otherwise identify the content item, e.g., from the content data 148. The content selector component 125 can also select the content item from the content provider computing device 155. For example responsive to a query received from the data processing system 105, the content provider computing device 155 can provide a content item to the data processing system 105 (or component thereof) for eventual output by the client computing device 150. The content item can be associated with a ride service to which the user has already subscribed. For example, the content item can be associated with the user's preferred ride service.

The content selector component 125 can select additional content items related to the third action. For example, the content item can include an audio message offering services of a ride service that can be offered as an alternative to the preferred ride service or a previously selected ride service for the client computing device 150. The alternative ride service can be offered to the user based on a comparison with one or more aspects of the ride service selected by the user. For example, if the fare offered by the alternative ride service is less than the ride service selected by the user, the content selector component 125 can present to the user with an option to select a cheaper alternative ride service. Other ride service aspects such as trip time, type of vehicle, and driver ratings, can also be considered. In some instances, the content selector component 125 can select a content item associated with the alternative ride service and present the content item to the user of the client computing device 150 without comparing any aspects of the two ride services.

As mentioned above, the content selector component 125, in addition to querying the data repository 145, can also communicate with the content provider device 155 to identify one or more content items. For example, the content selector component 125, upon receiving an indication of the third action associated with transportation, can communicate with the content provider device 155 to determine whether any alternative ride services are available. In response, the content selector component 125 can receive on or more content items associated with available alternative ride services. In its communication with the content provider device 155, the content selector component 125 can also include information about aspects of the transportation requested by the user to allow the content provider device 155 to provide an appropriate content item that can serve as an alternative to the ride service presented to the user. For example, the content selector component 125 can send information such as ride start address, ride destination address, requested time, number of passengers, and type of ride (e.g., economy or premium), to the content provider device 155. The content provider device 155 can use this information to determine whether one or more alternative ride services are available, and if available, send the one or more associated content items to the content selector component 125.

The audio signal generator component 130 can generate or otherwise obtain an output signal that includes the content items responsive to the third action. For example, the data processing system 105 can execute the audio signal generator component to generate or create an output signal corresponding to two or more content items, one of which can include a content item associated with, for example, the alternative ride service. The interface 115 of the data processing system 105 can transmit one or more data packets that include the output audio signal via the computer network 165 to the client computing device 150. For example, the data processing system 105 can provide the output audio signal from the data repository 145 or from the audio signal generator component 130 to the client computing device 150. The data processing system 105 can also instruct, via data packet transmissions, the content provider computing device 155 or the service provider device 160 to provide the output audio signal to the client computing device 150. The output audio signal can be obtained, generated, transformed into or transmitted as one or more data packets (or other communications protocol) from the data processing system 105 (or other computing device) to the client computing device 150.

The content selector component 125 can select the content item for the third action as part of a real-time content selection process. For example, the content item can be provided to the client computing device for transmission as audio output in a conversational manner in direct response to the input audio signal. The real-time content selection process to identify the content item and provide the content item to the client computing device 150 can occur within one minute or less from the time of the input audio signal and be considered real-time.

The output audio signal that corresponds to the content item, for example obtained or generated by the audio signal generator component 130 transmitted via the interface 115 and the computer network 165 to the client computing device 150, can cause the client computing device 150 to execute the audio driver 153 to drive the speaker 154 to generate an acoustic wave corresponding to the output audio signal. The acoustic wave can include words of or corresponding to the content item for the third action.

The acoustic wave can be output from the client computing device 150. For example, the acoustic wave can include the audio output of "Would you like to select XYZ ride service?" where "XYZ" can stand for a name or moniker for a preferred ride service. The acoustic waves associated with any additional content items can also be output from the client computing device 150. For example, the acoustic wave associated with the content item for an alternative ride service can include the audio output of "Would you like to consider an alternative ride service PQR which is $5 cheaper than the XYZ ride service?" where "PQR" can stand for a name or moniker of the alternative ride service.

The data processing system 105 can receive a response including an input audio signal from the client computing device 150. For example, the input audio signal of, for example, "OK, I would like to use PQR" From this information, the NLP component 110 identifies at least one request or at least one trigger keyword. For example, the NPL component 110 can identify a request for transportation, and a keyword "PQR" indicating that the alternative ride service PQR has been requested.

The data processing system 105 can notify the link generation component 120 to establish a link between a service provider that provides the alternative service selected by the user and the client computing device 150. The link generation component 120 can manage an establishment of a communication between the client computing device 150 and a service provider (such as the service provider device 160) associated with the service selected by the user. With reference to the example discussed above, the link generation component 120 can manage an establishment of a communication link between the client computing device 150 and the service provider device associated with the ride service "PQR," identified by the NPL component 110 in audio signal received from the client computing device 150.

One more service provider devices, such as the service provider device 160, provide services to client computing devices, such as the client computing device 150, based on identities associated with the client computing devices. These identities can take the form of a user-name, an ID, an account number, or other parameters that can uniquely identify the client computing device 150. The service provider devices 160 can store the identities associated with various client computing devices in a client database 164 along with additional information such as conversion information, local address, user-name, password, or device address, for example. The service provider devices can use the identities and the additional information to establish and maintain communications with the client computing device, as well as for accounting or administrative purposes.

The link generation component 120 can facilitate communications between the service provider device 160 and the client computing device 150. In one example, the link generation component 120 can manage the transmission of an identity associated with the client computing device 150 to the service provider device 160, so that the service provider device 160 can verify the identity of, and if verified establish communication with, the client computing device 150. The link generation component 120 can lookup or query the data repository 145 to determine whether any identifiers identifying the client computing device 150 to the selected service exist. For example the link generation component 120 can search the identifiers 147 to determine whether any account information exists for the client computing device 150 for the selected service. The identifiers 147 can include, for example, one or more user-names or device IDs associated with the client computing device 150 and the corresponding services. If an identifier identifying the client computing device 150 to the selected service provided by the service provider device 160 exists, the link generation component 120 can send the identifier to the service provider device 160.

In some cases, the link generation component 120 performs a lookup in a database. In some cases, the link generation component 120 can cache identifiers of established or active accounts and perform a comparison to identify an absence. By caching account identifiers that are established, the data processing system may not have to perform a lookup in the service provider's database. The account identifiers can be preloaded on the data processing system so the data processing system can perform a single call to determine whether the device is associated with an active account. The data processing system can load the account identifiers (or device identifiers) based on location of the client device. With the account identifiers already loaded on the data processing system, the data processing system can determine whether the client device has an account by comparing the client device with the preloaded active account identifiers. The data processing system can determine that the client device does not have an account by not finding a matching identifier in the preloaded set of active account identifiers; or by not finding an account identifier associated with a client device identifier corresponding to the end user's client device.

The identifiers 147 may not include an identifier associated with the client computing device 150 for the service provided by the service provider device 160. For example, where the alternative service presented to the client computing device 150 is a new service that the user has never tried before, an identifier associated with the client computing device 150 for that service may not exist in the data repository 145. In some examples, while the service provider device 160 may have an identifier associated with the client computing device 150, such an identifier may not yet have been stored in the data repository 145. In such cases, the link generation component 120 can communicate with the service provider device 160 to determine the presence in the client database 164 of an identifier associated with the client computing device 150. The service provider device 160, can communicate with a client database 164, which stores client information, to determine the presence of identifiers or other data associated with the client computing device 150. Alternatively, the link generation component 120 can itself communicate with the client database 164, by a lookup or a database query operation, to determine the presence of any identifiers associated with the client computing device 150.

Once the identifier associated with the client computing device 150 is located, the link generation component 120 can send the identifier to the service provider device 160 on behalf of the client computing device 150. The link generation component 120 also can send instructions to the service provider device 160 to use the identifier to establish communication with the client computing device 150.

Where, for example, the identifier is not present in both the data repository 145 and the client database 164, the service provider device 160 may not be able to establish a communication with the client computing device. Where the service provider device 160 is able to communicate with the client computing device 150, the absence of an identifier in both the data repository and the client database 164 may need additional communication, such as queries and responses, between the service provider device 160 and the client computing device 150. For example, the service provider device 160 can request the client computing device 150 to establish an account before the service can be provided. The establishment of an account may require additional communications between the client computing device 150 and the service provider device 160 to exchange usernames, passwords, conversion information, authentication, and other information, leading to use of additional time and resources, such as bandwidth. In such cases, the link generation component 120 can facilitate the establishment of this communication by generating an account on behalf of the client computing device 150. For example, the link generation component can generate a unique virtual identifier associated with the client computing device 150. The link generation component 120 can, via the interface 115, send the virtual identifier to the service provider device 160. The virtual identifier can be communicated to the service provider device 160 using data packets (for example, in a payload section of the data packets) via the interface 115 and over the network 165. The virtual identifier can be used by the service provider device 160 to create an account or a record associated with the client computing device 150, and establish communication with the client computing device 150. In this manner, the link generation component 120 not only improves the reliability of the system by facilitating the establishment of communication between the service provider device 160 and the client computing device 150, but also improves the efficiency of the system by creating an account on behalf of the client computing device 150, thereby saving time and resources that would otherwise be utilized in communications between the service provider device 160 and the client computing device 150 to establish an account prior to providing the requested service.

The virtual identifier can be a combination of data associated with the client computing device 150. For example, the virtual identifier can include one or more of a device ID (such as a MAC ID of the client computing device 150), an Internet Protocol (IP) address of the client computing device 150, name of a user associated with the client computing device 150, a telephone number of the user, and any other data associated with the client computing device 150 which includes data associated with any user that uses the client computing device 150. The virtual identifier can be determined by processing the one or more of the above mentioned data. For example, the link generation component 120 can use a hash function to generate a virtual identifier, where an input to the hash function can be provided with one or more of the above mentioned data associated with the client computing device 150. The link generation component 120 can also use a cryptographic function (such as AES, DES, RSA, and ECC), to generate the virtual identifier, where the input to the cryptographic function can include one or more of the above mentioned data associated with the client computing device 150.

The link generation component 120 can use a digital certificate or a public key associated with the client computing device 150 as the virtual identifier. In this case, the virtual identifier can be used by the service provider device to not only authenticate the client computing device 150, but to also securely communicate with the client computing device 150 using a public key infrastructure (PKI).

The link generation component 120 can send the virtual identifier to the service provider device 160. The virtual identifier can be communicated to the service provider device 160 using data packets (for example, in a payload section of the data packets) via the interface 115 and over the network 165. The service provider device 160, can use the virtual identifier to create a database entry associated with the virtual identifier. The database entry allows the service provider device 160 to create at least one record associated with the client computing device 150, and enables the service provider device 160 to identify, and thereby, communicate with the client computing device 150. The link generation component 120 can also store the virtual identifier as one of the identifiers 147 in the data repository 145. The link generation component 120 can also store a content item or an identity of the service provider device 160 in association with the virtual identifier. For example, the link generation component 120 can store the identity "PQR" of the alternative ride service selected by the user in association with the virtual identifier, or a unique identifier of the service provider device 160. This allows the link generation component 120 to determine the presence of an identifier for the client computing device 150 for the "PQR" ride service, if in the future, the client computing device 150 again selects the same ride service.

In some examples, the link generation component 120 can send additional data associated with the client computing device 150, when it sends the virtual identifier to the service provider device 160. For example, the link generation component 120 can send additional information that can facilitate the establishment of communication between the service provider device 160 and the client computing device 150. For example the link generation component 120 can send information such as home address, name of a user, and conversion information associated with the client computing device 150. The additional information also can be communicated to the service provider device 160 using data packets (for example, in a payload section of the data packets) via the interface 115 and over the network 165. This information can permit the service provider device 160 to create a database entry with information that can be sufficient to at least provide the currently requested service. Of course, the minimum amount of information associated with the client computing device 150 needed to provide the requested service may vary based on the type of service requested. In such instances, the link generation component 120 can store in the data repository 145 minimum data needed by the service provider device 160 to provide one or more services.

The link generation component 120 also can send information such as a network address of the client computing device 150 or the MAC address of the client computing device so that service provider device 160 can establish connection with the client computing device 150. The link generation component 120 can format the virtual identifier and the additional information in a data structure as per the specifications of the service provider device 160 for initiating communication or a service request.

For example, FIG. 2A shows a first data structure 200 that can be used by the link generation component 120 to send data to the service provider device 160. In particular, the first data structure 200 can be used by the link generation component 120 to send a virtual identifier to the service provider device 160 along with additional information, such as profile information of the client computing device 150, for the service provider device 160 to use to establish an account associated with the virtual identifier. The data structure 200 can improve the reliability and efficiency of data transmission between the data processing system 105 and the service provider device 160. The first data structure 200 includes fields such as Identifier, Client Computing Device Identifier, Client Computing Device Address, Conversion Information, and New Account. The Identifier field can include the virtual identifier generated by the link generation component 120 discussed above. The Client Computing Device Identifier and the Client Computing Device Address can include data that can allow the service provider device 160 to communicate with the client computing device 150, and can include a MAC address, a network address, or other identifier of the client computing device 150. The Conversion Information can include information that can allow the service provider device 160 to charge the client computing device 150 for the services rendered, and can include data such as credit card information, a code or a link to online transfer services. The New Account field can include instructions for the service provider device 160 to create a new record in the client database 164 associated with the virtual identifier included in the Identifier field. In some examples, the New Account field can include a binary message (e.g., Y/N, or 0/1.) which the service provider device 160 can interpret to mean whether to, or not, create a new record associated with the information in the Identifier field.

The link generation component 120 can send additional information to the service provider device 160 that can allow the service provider device 160 to establish connection or provide the requested service to the client computing device 150. FIG. 2B shows a second data structure 202 that can be used by the link generation component 120 to send additional information, such as service specific information, to the service provider device 160. The second data structure 202 includes fields such as Identifier, Content Item or Service, Start Address, Destination Address, Requested Time, and Conversion Information. The information included in the Identifier field can include an identifier of the client computing device 150 that is known to the service provider device 160, or a virtual identifier generated by the link generation component 120 as discussed above. The Content Item or Service field can include the specific service requested by the client computing device 150. That is, the Content Item or Service field can include a reference to the Content Item in relation to which the client computing device 150 requested service, or can include the name of the service itself. For example, the content item associated with the PQR ride service discussed above can be included, which can indicate to the service provider that the service requested is associated with the alternative content item presented to the client computing device. The Start Address and the Destination Address can include the home address and the requested destination of the requested ride service. The Requested Time field can include the pick-up time requested by client computing device 150, and the Conversion Information can include data such as credit card information, a code or a link to online transfer services.

The additional information can include information other than personal information associated with the client computing device 150. For example, the link generation component 120 can request from the client computing device 150 data such as the GPS coordinates of the client computing device 150. In cases where the client computing device 150 is a mobile device such as a smartphone, the instantaneous GPS coordinates of the client computing device 150 can be sent to the service provider device 160 so that the service provider device 160 can send the ride service based on the current location of the client computing device 150. The link generation component 120 can also request other data such as temperature, noise level, signal strength of the cell in which the client computing device 150 is currently communicating, and also send this data to the service provider device 160. FIG. 2C shows a third data structure 204 that can be used to send the above information to the service provider device 160.

The first, second, and third data structures 200, 202, and 204 can include fewer or more fields than those shown in FIGS. 2A-2C. The data processing system 105 can define the data structures in an extensible markup language (XML) for sending information to the service provider device 160. The data associated with the first, second, and third data structures 200, 202, and 204 can be communicated using data packets, for example, in the payload section of the data packets, over the network 165.

The service provider device 160 can use the virtual identifier and the additional information provided by the link generation component 120 (such as that provided in the first data structure 200) and use the information to communicate with the client computing device 150 to acquire additional information it may need to appropriately provide the requested service. For example, the service provider device 160 can use the service provider NLP component 161 to generate audio signals that query the user for additional information. The queried information can include destination address, pick-up address, requested time, and conversion information. The audio signals representative of the responses by the user at the client computing device 150 can be received by the service provider device 160 and be processed by the service provider NLP component 161 to extract the desired information. The service provider device 160 can store the extracted information in the client database 164 in association with the identifier of the client computing device 150.

The service provider device 160 can use the data processing system 105 as an intermediary to acquire the audio signals. For example, the service provider device 160 can send data packets containing text based queries in addition to a request for the data processing system 105 to convert the text based queries into audio signals and to transmit the audio signals to the client computing device 150. The NPL component 110 of the data processing system 105 can convert the text based queries into audio signals, which can be transmitted to the client computing device 150. The data processing system 105 can also receive from the client computing device 150 audio signals that include responses to the queries. The NLP component 110 can convert the audio signals into text, and transmit the converted text to the service provider device 160.

The link generation component 120 can instruct the service provider device 160 to create a temporary database record or account associated with the virtual identifier. For example, the database record associated with the virtual identifier can be deleted after the service requested by the client computing device 150 is completed. The link generation component 120 can provide a time stamp, or a duration, with the virtual identifier. The time stamp or duration can indicate that the virtual identifier is invalid after the time derived from the time stamp or the duration. The service provider device 160 can delete the database record associated with the virtual identifier if the virtual identifier is invalid.

The link generation component 120 can refrain from sending any information about the client computing device 150 or a user associated with the client computing device 150 which may compromise privacy or security. For example, the link generation component 120 can send the virtual identifier to the service provider device 160, but refrain from sending any conversion information. The conversion information can be stored at the data processing system 105, and can be used by the data processing system 105 to make conversion transactions with the service provider device 160 on behalf of the client computing device 150.

The link generation component 120 can communicate with the service provider device 160 or the client database 164 to synchronize the information stored in the data repository 145 with the data stored in the client database 164. For example, data related to accounts or records associated with the client computing device 150 can be exchanged such that the data repository 145 or the client database 164 have up to date information.

Figure 3:
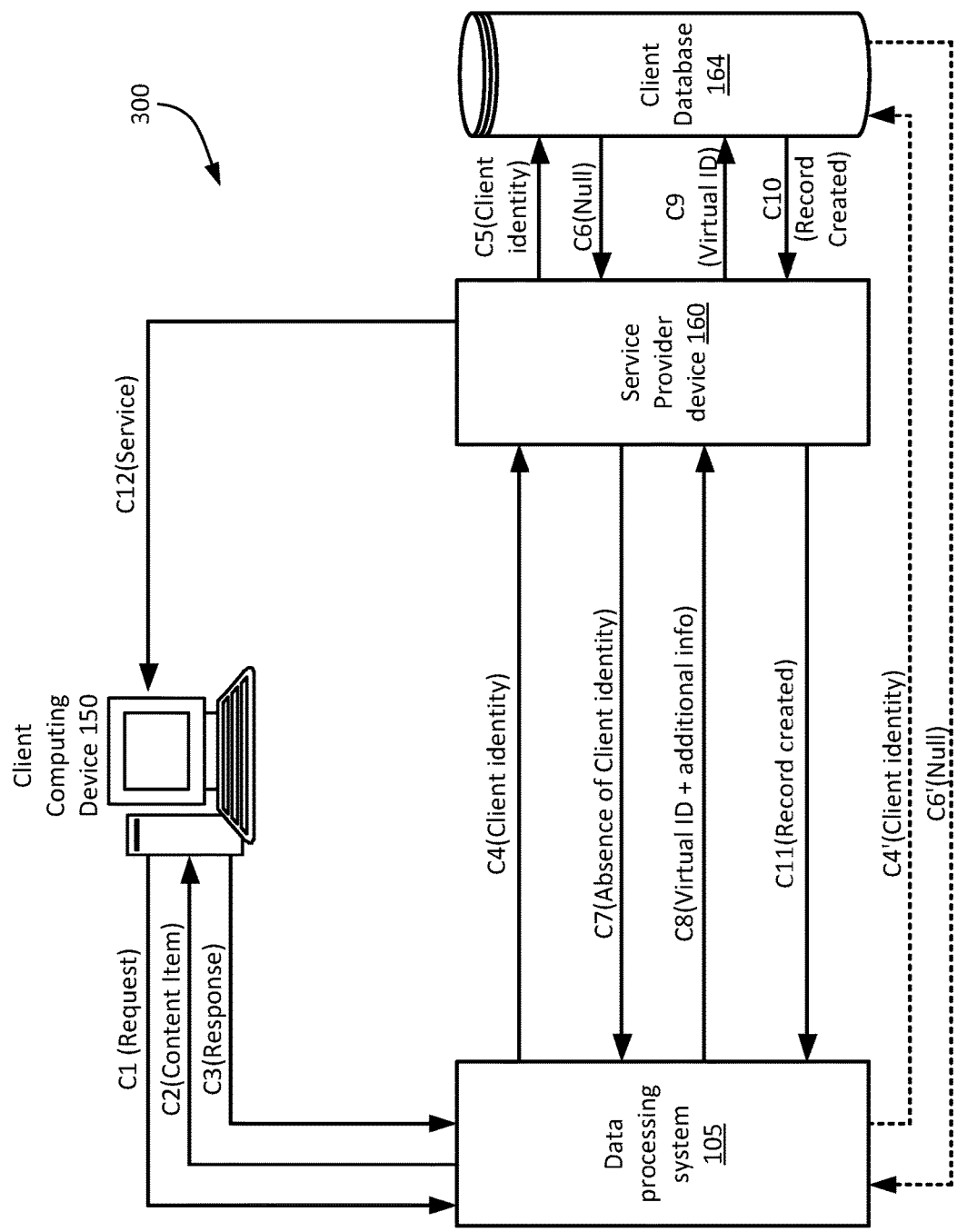
FIG. 3 depicts a functional diagram of a thread including sequence dependent actions.

FIG. 3 depicts a representation of message flows 300 between various entities of the system 100 shown in FIG. 1. In particular, FIG. 3 depicts message flows 300 between the data processing system 105, the client computing device 150 and the service provider device 160, discussed above in relation to FIG. 1. The message flows 300 depicted in FIG. 3 are carried out such that the data processing system 105 (and in particular the link generation component 120) can facilitate the establishment of communication between the client computing device 150 and the service provider device 160 in instances where the lack of an identifier associated with the client computing device 150 may prevent the establishment of such communication. Further the message flows 300 are carried out to improve the reliability and efficiency of data transmission between the data processing system 105 and the service provider device 160, while also reducing resource consumption (e.g., bandwidth) by passing virtual identifiers and avoiding multiple queries and communications between the service provider device 160 and the client computing device 150 to enable the service provider device 160 to provide a requested service.

As discussed above, the data processing system 105 can receive a communication C1 from the client computing device 150, where the communication C1 can include an audio signal that includes a voice command from a user associated with the client computing device 150. The data processing system 105, and in particular the NLP component 110, can process the audio signal and identify a request and a keyword. For example, as discussed above the audio signal can include a message such as "OK, I would like to go to go dinner and then a movie tonight." The data processing system can process the audio signals and detect at least one request indicating an interest to attend dinner and a movie, and at least one trigger keyword, e.g., "go" indicating a need for transportation. In response to determining the keyword is associated with transportation, the content selector component 125 can select a ride service that can be offered as an alternative to the default or preferred ride service associated with the client computing device 150. The data processing system 105 can generate an audio signal that includes a message presenting the content item to the user. For example, the audio file can include a message such as "Would you like to consider an alternative ride service PQR which is $5 cheaper than the XYZ ride service?" where "PQR" can stand for a name or moniker of the alternative ride service. The data processing system 105 sends a communication C2 that includes this audio file associated with the content item, as shown in FIG. 3.

The client computing device 150 can send a communication C3 in response to the communication C2, where C3 includes an audio signal that represents a response from a user. For example, the audio signal can include a response such as: "OK, I would like to use PQR" From this information the NLP component 110 (FIG. 1) identifies at least one request or at least one trigger keyword. For example, the NPL component 110 can identify a request for transportation, and a keyword "PQR" indicating the that the alternative ride service PQR has been requested.

Once the data processing system 105 identifies that the client computing device 150 is requesting the alternative content item, the link generation component 120 (FIG. 1) determines the service provider device 160 associated with the requested content item. The link generation component determines whether the data repository 145 (FIG. 1) includes any identifiers associated with the requested content item and the client computing device 150. If no identifier are found, the link generation component 120 sends a communication C4 to the service provider device 160 to determine the presence of a database record associated with the client computing device 150. The communication C4 can include an identity of the client computing device 150, or an identity of a user associated with the client computing device 150. The link generation component 120 can send the communication C4 to the service provider device 160 without querying the data repository 145 (FIG. 1).

The service provider device 160, in response to receiving the query for database records associated with the client identity in the communication C4, can send a communication C5 to the client database 164 to determine whether a database record associated with the client identity is present in the client database 164. If the client database 164 does not include any records associate with the client identity received in the communication C5, the client database 164 can return a communication C6 indicating that no such record exists. The service provider device 160 can, send a communication C7 to the data processing system 105 indicating that no database record associated with the client identity included in the communication C4 exists in the client database 164. The data processing system 105 can directly query the client database 164 with a communication C4'(Client identity) (shown in dotted lines in FIG. 3), to determine whether any records associated with the client identity are present in the client database 164. If no record are found, the client database 164 can return a communication C6' with a Null response indicating the absence of the queried records. In some cases, the data processing system can determine the absence based on Null respond or other indication, response, character, symbol, string, alphanumeric character, or value that indicates an absence.

The service provider device 160 may be unable to provide the requested service to the client computing device 150, because there are no records associated with the client computing device 150 present in the client database 164. However, the data processing system 105 can mitigate the risk of lack of communication due to the lack of database records. In particular, the data processing system 105 generates a virtual identifier associated with the client computing device 150, and sends a communication C8 to the service provider device 160 to create a database record associated with the virtual identifier in the client database 164. As discussed above, the virtual identifier can include a combination of various data associated with the client computing device 150. For example, the virtual identifier can include a hash function of one or more of a device ID (such as a MAC ID of the client computing device 150), an Internet Protocol (IP) address of the client computing device 150, name of a user associated with the client computing device 150, a telephone number of the user, and any other data associated with the client computing device 150. The virtual identifier can include a digital certificate or a public key of the client computing device 150. The communication C8 also can include additional information associated with the client computing device 150 that can facilitate the establishment of communications between the service provider device 160 and the client computing device 150, or facilitate the provision of the requested service by the service provider device 160. The data processing system 105 can send the virtual identifier and the additional information formatted in a data structure such as the first, second, or the third data structures 200, 202, or 204 shown in FIGS. 2A-2C. The virtual identifier and the additional information can be communicated to the service provider device 160 (FIG. 1) using data packets (for example, in a payload section of the data packets) via the interface 115 (FIG. 1) and over the network 165 (FIG. 1).

The service provider device 160, upon receiving the communication C8, can create a database record based at least on the virtual identifier by sending a communication C9 to the client database 164. The communication C9 also can include the additional information received in the communication C8. After creating the database record associated with the virtual identifier, the client database 164 can send a communication C10 to the service provider device 160, indicating that the database record has been created. The service provider device 160, can send a communication C11 to the data processing system 105 indicating that the database record was successfully created.

Once the record associated with the client computing device 150 has been created in the client database 164, the service provider device 160 can communicate with the client computing device 150 to provide the service requested in the communication C3. For example the service provider device 160 can send a communication C12 to the client computing device 150 to confirm that the request for the alternate ride has been successful, or to acquire additional information from the client computing device 150 in relation to the requested service.

As discussed above, the data processing system 105 facilitates in establishing communication between the service provider device 160 and the client computing device 150 in instances where the lack of a database record associated with the client computing device 150. This avoids a situation where the request made by the client computing device would be otherwise stalled.

Figure 4:
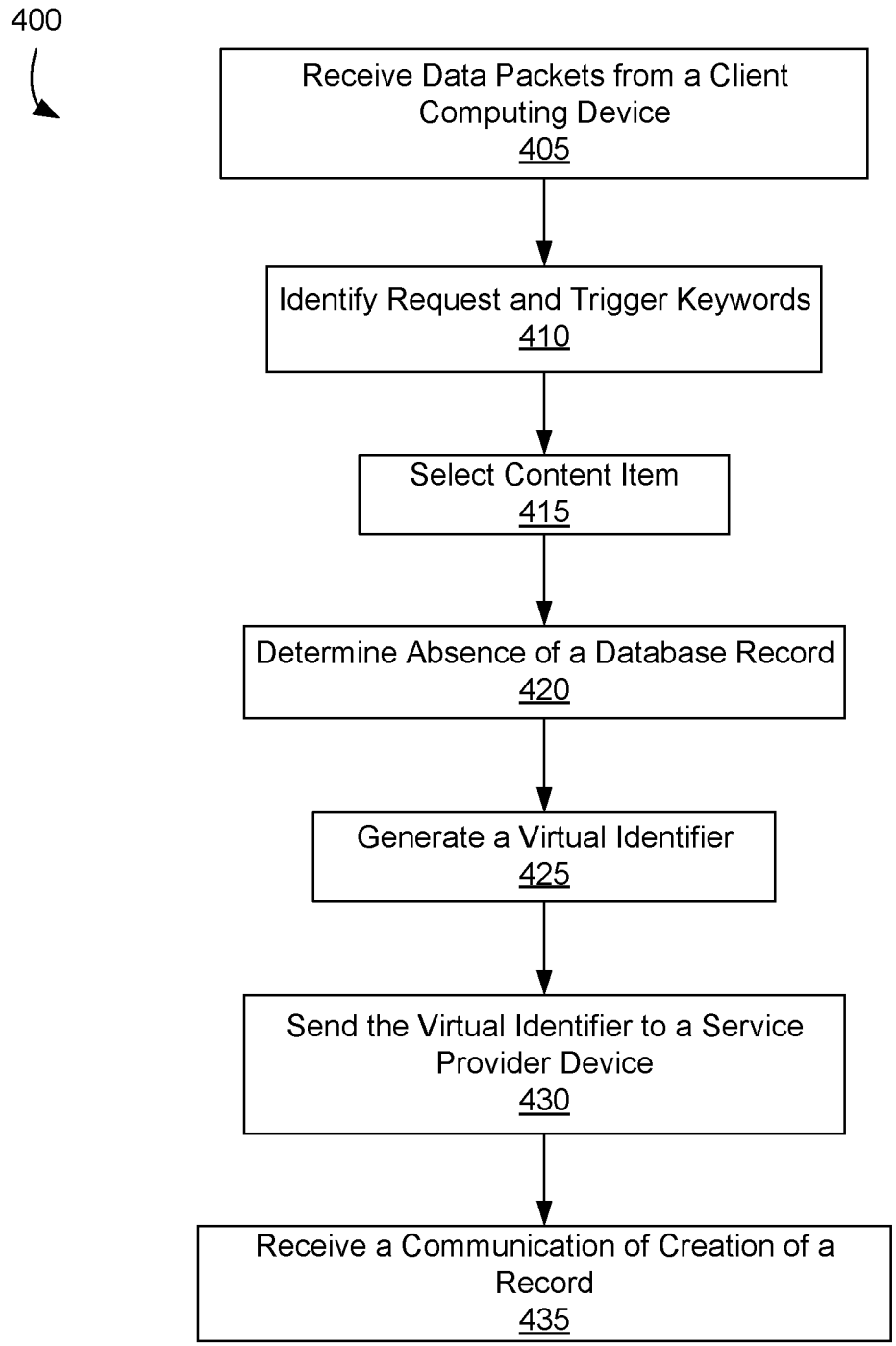
FIG. 4 depicts method to invoke actions for establishing communications between a client computing device and a service provider device in a voice activated data packet based computer network environment.

FIG. 4 depicts a method 400 to invoke actions for mitigating stalling of communication between a client computing device and a service provider device in a voice activated data packet based computer network environment such as the system 100. The method 400 depicted in FIG. 4 allows the data processing system 105 (e.g., via the link generation component 120) to facilitate the establishment of communication between the client computing device 150 and the service provider device 160 in instances where the lack of an identifier associated with the client computing device 150 may prevent the establishment of such communication. Further the method 400 improves the reliability and efficiency of data transmission between the data processing system 105 and the service provider device 160, while also reducing resource consumption (e.g., bandwidth) by passing virtual identifiers and avoiding multiple queries and communications between the service provider device 160 and the client computing device 150 to enable the service provider device 160 to provide a requested service.

The method 400 can receive data packets rom a client computing device (ACT 405). For example, the data processing system 105 can execute, launch or invoke the NLP component 110 to receive packet or other protocol based transmissions via the network 165 from the client computing device 150. The data packets can include or correspond to an input audio signal detected by the sensor 151, such as an end user saying "OK, I would like to go to go dinner and then a movie tonight" into a smartphone. Another example of this method step has been discussed above in relation to FIG. 3, where the communication C1, which includes a voice command from a user associated with the client computing device 150, is received by the data processing system 105.

The method 400 can identify at least one request or at least one trigger keyword from the input audio signal (ACT 410). For example, the NLP component 110 can parse the input audio signal to identify requests ("dinner" or "movie") as well as trigger keywords "go" "go to" or "to go to" that correspond or relate to the request. The data processing system 105 can determine actions associated with the keyword, such as an action related to providing transportation to the user.

The method 400 can select a content item based on the keyword identified by the data processing system (ACT 415). For example, the content selector component 125, based on the identified requests and keywords, can select at least one content item. The data processing system 105 can select at least one output audio signal associated with the selected content item. For example, the content selector component 125 can select an output audio signal corresponding to an alternate ride sharing service. Another example of selecting a content item has been discussed above in relation to FIG. 3, where the data processing system 105 selects an output audio signal saying: "Would you like to consider an alternative ride service PQR which is $5 cheaper than the XYZ ride service?" where "PQR" can stand for a name or moniker of the alternative ride service. The data processing system 105 sends a communication C2 that includes this audio file associated with the content item, as shown in FIG. 3.

The method 400 includes determining an absence of a database record associated with the client computing device 150 (ACT 420). For example, the link generation component 120 can query (communication C4, FIG. 3) the service provider device 160 to determine whether a database record associated with the client computing device 150 is present in the client database 164 of the service provider device 160. Alternatively, as shown in FIG. 3, the data processing system 105 can directly query (communication C4', FIG. 3) the client database 164 to determine the presence of records associated with the client computing device 150. The data processing system 105 can also query the data repository 145 to determine whether any of the identifiers 147 include an identifier associated with the client computing device 150 and the content item requested. If no record for an identifier associated with the client computing device 150 is present, the client database 164 can return a NULL response (communication C6 and C6', FIG. 3), indicating as much.

The method 400 includes generating a virtual identifier (ACT 425). As discussed above, the link generation component 120 can generate a virtual identifier associated with the client computing device 150. The virtual identifier can be a unique identifier that identifies the client computing device 150. The virtual identifier can be a randomly generated number. The virtual identifier also can be determined using a hash function or a cryptographic function on data associated with the client computing device 150. Further, the virtual identifier can include a digital certificate or a public key that can be used for secure communication using a PKI.

The method 400 also includes sending the virtual identifier to the service provider device (ACT 430). As discussed above in relation to FIGS. 1-3, the link generation component 120 can send the virtual identifier associated with the client computing device to the service provider device 160 (communication C8, FIG. 3). The virtual identifier can be communicated to the service provider device 160 using data packets (for example, in a payload section of the data packets) via the interface 115 and over the network 165. The service provider device 160, creates a database record associated with the virtual identifier in the client database 164. Creating the record in the client database 164 can include creating an account for the client computing device 150 to enable the service provider device 160 to provide the requested service to the client computing device 150. The link generation component 120 can also store the virtual identifier as one of the identifiers 147 in the data repository 145. In one example, the link generation component 120 can send additional information to the service provider device 160. For example, the link generation component 120 can send information associated with the client computing device 150. Also, the link generation component 120 can poll for data from one or more sensors on the client computing device 150, and send the data along with the virtual identifier.

The method 400 includes receiving a communication of creation of a record (ACT 435). For example, as shown in FIG. 3, the data processing system 105 receives a communication C11 indicating that a record in the client database 164 has been created. After receiving the record creation communication, the data processing system 105 can wait to receive additional requests from the client computing device 150, or request for additional data from the service provider device 160.

Figure 5:
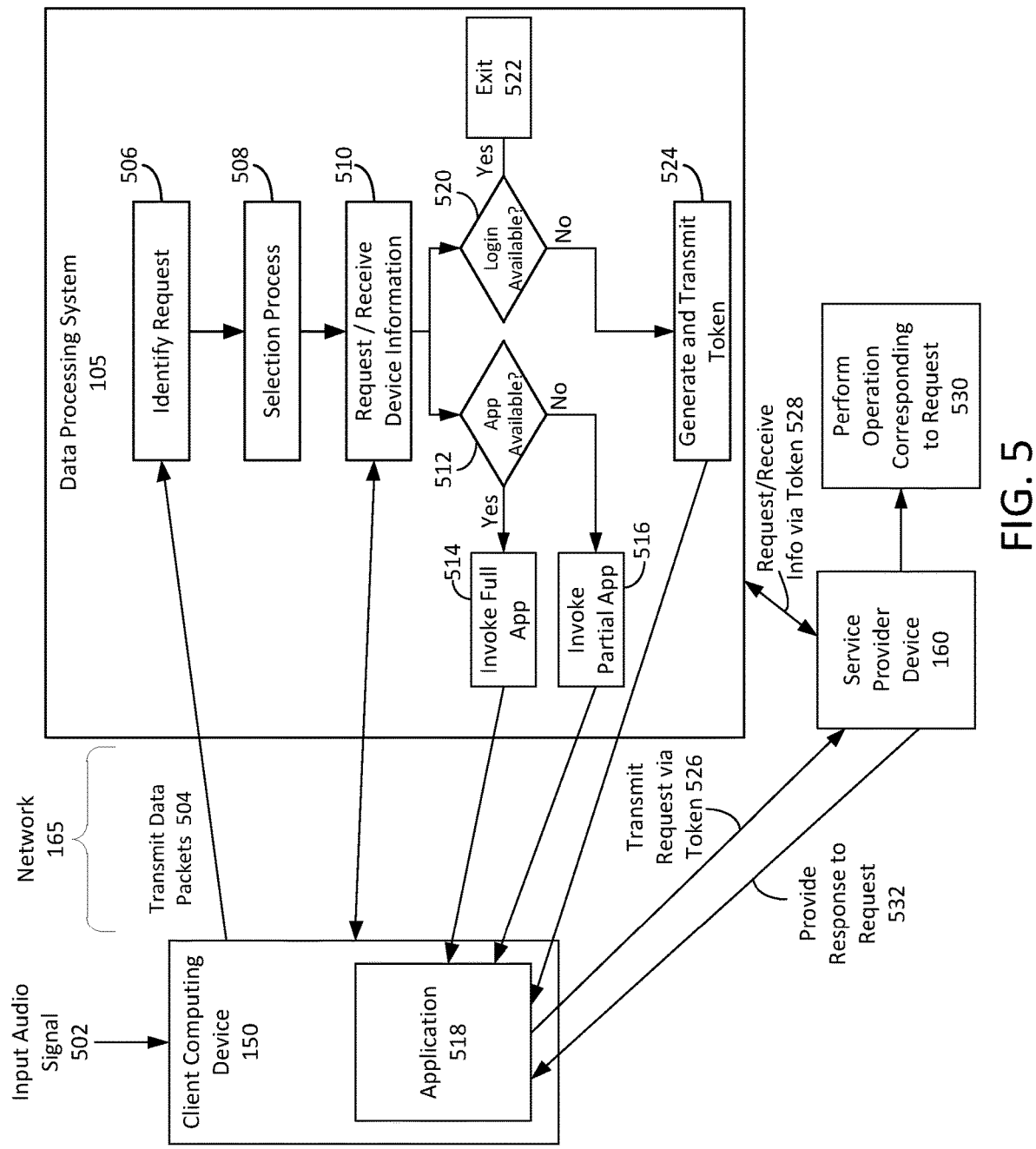
FIG. 5 depicts an operational diagram of a system to reduce network communications between device to process an operation.

FIG. 5 depicts an operational diagram of a system to reduce network communications between devices to process an operation. A data processing system can communicate between two or more devices to perform an operation. Performing an operation may result in communications between multiple devices. In some cases, performing an operation or transaction may cause communications to occur between several computing devices. However, one or more of the computing devices used to facilitate the operation may request login information, account information, or authentication credentials.

For example, digital assistant can integrate with third party service providers or applications. However, such integration may not be seamless. For example, in a shopping-related scenario that involves an electronic payment transaction, the service provider may require or request login credentials be input into the application, and initiate a checkout process in which payment information or shipping information is provided. Providing login credentials, payment information or shipping information may cause additional network communications, remote procedure calls, battery utilization (e.g., to enter in the information), delay (e.g., due to searching for and entering the information), or otherwise adversely impact the graphical user interface of seamlessness of an integration between the digital assistant and the third-party application or service provider. For example, for applications that are already installed on the client computing device, logging in requires remembering a username and password and checking out requires either remembering payment information or pulling out a wallet and entering payment information or alternatively logging into a different payment service if the application has no payment information already stored. For applications that are not already installed, the barrier to entry is that much higher—the user has to both create a login and enter payment information at checkout. Creating an account can result in several network communications between the client device and the data processing system or service provider device, as well require the creation of a new account profile that may take up storage space on memory of a server.

In an example, a client device may request a ride to the airport. The client device can indicate the ride sharing application to use, or the data processing system can automatically select the ride sharing application to use. The data processing system can determine that the client device may not have utilized the ride sharing application before. The digital assistant, or data processing system, can install the ride share application on the client device. Rather than require the user to establish an account on the ride sharing application, provide login creditionals, or otherwise setup or configure the application, the digital assistant (or data processing system) can bypass both the authentication and payment steps associated with the ride sharing application, by bringing up a webview of the application that would let the user select the service they want. The data processing system can then facilitate the electronic transaction (e.g., the payment) in a back-end process that utilizes payment information already stored by the data processing system for the client device.

In another example, the client device can generate a query to purchase a book. The data processing system or digital assistant can select an application that is configured to process the query. The data processing system can provide a webview of the application via the client device. The data processing system can instruct a local digital assistant executing on the client device to bring up the webview, or otherwise cause the webview to be launched or provided via the client device. The webview can include results responsive to the query. The webview can include search results that include the book. The client device can receive an indication to purchase the book. For example, a user can select (via voice input, touch input, or other input) the item to purchase. The data processing system or digital assistant can then seamlessly perform the checkout process without requiring the user to log into the application.

The webview can refer to or include a preview of the application presented via the client device without actually installing the application on the client device. A webview can refer to or include a browser bundled inside of a mobile application that can produce a hybrid application. A webview can refer to or include a component that allows an application to display web content. A webview can refer to or include a component that allows a third party application to show content in an in-application browser or in an application screen that pulls data from the Internet. Webview can include a system component for a mobile operating system or other operating system that allows application configured for the operating system to display content from the web directly inside the application.

A webview can refer to or include a sandboxed computing environment. The webview can be invoked by the application, digital assistant, data processing system, or client computing device. The sandboxed computing environment can prevent the webview from accessing certain data. For example, the webview of an application can have restricted access in order to prevent malicious activity by the application, viruses, or to keep the application lightweight, thereby reducing processor utilization on the client computing device. For example, a webview version of the application may utilize less computing resources of the client computing device, such as less memory, processor utilization, or bandwidth.

Furthermore, the systems and methods of the present technical solution allow scalable and seamless integration between digital assistants and applications. For example, rather than require each third-party application developer or service provider to generate code to integrate with the digital assistant, the data processing system can generate tokens and utilize a webview or other version of the application to facilitate the electronic transaction or operation, without needing new code or updates to be pushed.

Thus, and in some cases, systems and methods of the present technical solution can provide a mechanism that allows users to pay with a digital assistant from within an application they linked to from the digital assistant. The digital assistant (or data processing system) can perform authentication for both identity and purchases so that the deeplinked application does not have to handle these aspects, thereby reducing computing resource utilization by the deeplinked application. By handling the authentication for identity and purchases, the digital assistant can eliminate the two critical drop-off points for users: signing in and filling payment information. The present technical solution uniquely allows the user to sign in without any button presses and to authenticate the purchase with their trusted digital assistant instead of the third-party application.

Since this technical solution allows the deeplinked application to skip or by-pass sign-in and purchase flows, the digital assistant can facilitates the seamless use of applications that are not fully or wholly installed on the client computing device. This can be referred to as a partially installed application, or webview version of the application. A user can interact with the partially installed application using iframes and web based technology in order to embed an interactive element within the page. The partially installed application can include a lightweight version of the application that can be run out of memory on the client computing device as opposed to being fully installed.

The digital assistant or data processing system can pass an authentication token into the deeplinked or embedded application (e.g., partially installed application or webview). This token can be used by the other application in order to authenticate the user or to instruct the digital assistant to initiate a purchase flow. This authentication token can be unique in so far as it is tied to a particular session and the specific application that the token was sent to. The token can be used via a client software development kit ("SDK") which packages with the token the invoking application, device identifier, and other session identifying data. The client SDK then sends this package to the server (e.g., data processing system) for authentication and the server compares the invoking application and device identifiers to ensure that the authentication token is only being used by the original intended application.

In a secure implementation of this technical solution, the device identifier can be unique and only accessible by the digital assistant and the digital assistant SDK. This unique identifier can have a one-to-one ("1:1") mapping with the client device or with the user account or with the combination of the user account on the particular client device. This device identifier can prevent a malicious third-party from using the token on a separate application.

In some cases, the authentication token can include a set of permissions for which behaviors are acceptable. The authentication token can be configured to block or disable certain actions. For example, the authentication token can allow an application to invoke the digital assistant for a purchase flow, but block the digital assistant from sending messages.

When deeplinking into third-party applications, the client computing device may not install the entire application binary on the client computing device. Using technology such as a webview, preview version, partial version, or instant applications, the client computing device can provide a fraction or portion of the application features without installing the whole binary of the application. Thus, a digital assistant configured to provide authentication tokens to a partial application can provide a complete authenticated session and even a seamless purchase experience without having to download the application for the other service. For example, using both technologies a user could use their digital assistant to call a ride sharing service, use the partial version of the application to specify or indicate the pickup location and see the car location, and pay via the digital assistant without ever having to install the ride sharing application, provide their payment information to the ride sharing application, or re-authenticate themselves.

Still referring to FIG. 5, among others, an operational diagram of a system to reduce network communications between device to process an operation. The system 500 can include one or more component or function depicted in FIG. 1, 2A, 2C, 3, 4, or 6. For example, the system 500 can include a data processing system 105 that communicates or interfaces with client computing device 150, or service provider device 160.

At ACT 502, the client computing device 150 can receive an input audio signal. The input audio signal can include a request or a query. The input audio signal can include a voice command. The input audio signal can include one or more words, phrases, terms, sounds, or other input. In some cases, the input signal can be a visual input signal instead of or in addition to an input audio signal In some cases, the input signal can include, in addition to or instead of audio input, touch input, keyboard input, mouse input, motion input or other sensory input. The client computing device 150 can include one or more sensors that detect the input audio signal, or other input.

At ACT 504, the client computing device 504 can transmit data packets to the data processing system 105. The data packets can include or be based on the input audio signal. The client computing device 150 can convert the input audio signal to data packets configured for transmission over a network, such as network 165. The client computing device 150 can include a local NLP, processor, or other component configured to convert the input audio signal into data packets or text and forward the data packets to the data processing system 105.

At ACT 506, the data processing system 105 can identify a request. The data processing system 105 can identify the request based on the data packets received from the client computing device 150, which the client computing device 150 can generate based on the input audio signal received at ACT 502. The data processing system 105 can identify the request using a natural language processor component 110, for example. The data processing system 105 can identify the request as a request to perform an operation, task, or action. The request can be a request for information. The request can include a query. The request can include information to facilitate performing the operation. For example, the request can be for a ride sharing service, restaurant reservation, movie ticket purchase, book purchase, electronic transaction, search query, directions, take out or delivery food, or any other request or operation. In some cases, the request can be to adjust a setting on a digital device or disable or enable a digital device (e.g., turn on a network connected light, play music on a network connected speaker, change the temperature on a network connected thermostat, or change the channel on a network connected display).

At ACT 508, the data processing system 105 can perform a selection process. The selection process can be a content selection process to select digital components, resources, or content items. The data processing system 105 can perform the selection process via a content selector component 125. In some cases, the content selector component 125 can receive the request or one or more keywords identified by the natural language processor and select, based on the request or the one or more keywords, a digital component via a real-time selection process. Real-time can refer to selecting the resource, digital component, or application responsive to the request or within a predetermined time of receiving the request.

The data processing system 105 can select applications at ACT 508. Application can include or refer to scripts, programs, code, widgets, or other digital components configured to facilitate performance of one or more aspects of the operation or task associated with the request. For example, the digital component can include an application such as a ride sharing application that can perform the operation related to the request for a ride share to transport a user from a first geographic location to a second geographic location.

The data processing system 105 can utilize the content selector component 125 or other component to select digital components or applications responsive to the request associated with the input audio signal received at ACT 502. The data processing system 105 can, for example, utilize a map data structure that maps action types to applications. For example, the data processing system 105 can utilize the direct action API 135 to identify and generate a direct action data structure responsive to or corresponding to the request. The direct action API 135 can also identify a service provider 160 to perform the operation or action responsive to the request. The data processing system 105 can select the application associated by the service provider device 160. For example, the service provider device 160 can include a ride sharing company's server, and the selected application can be developed or otherwise provided by the ride sharing company and configured to facilitate the ride sharing request.

The data processing system 105 can select the application via a lookup in an application database and from a plurality of applications. The data processing system 105 can select the application from a plurality of applications. The selected application can correspond to the request. The data processing system 105 identify a deeplink for the application. The data processing system 105 can cause the application to execute at least partially on the client computing device. A deeplink can refer to a hypertext link to a resource, digital component, or application that is on a web site other than a main or home page. The deeplink can be a subdomain or of the main page. The deeplink for the application can correspond to a web-based view or webview of the application. The data processing system 105 can provide the deeplink to the client computing device 150 to cause the client computing device 150 to execute, render, or otherwise invoke the deeplinked webview version of the selected application 518.

The deeplink can include or refer to a uniform resource identifier (URI) that links to a specific location within the application, rather than only launching the application. The specific location in the application can be determined or selected based on the type of request.

The request or information associated with the request identified at ACT 506 can include information about the digital component to select, such as an identifier of the application or service provider to select to perform or facilitate the desired operation. For example, the input audio signal can indicate the name of the application or type of the application or other identifier of the application. The data processing system 105 can identify the name of the application, and then select the application corresponding to the name. The data processing system 105 can perform a lookup in an application database to identify the application. The data processing system 105 can perform the lookup using the name or other identifier associated with the request or input audio signal.

The data processing system 105 can initiate a conversation session or communication session with the client computing device 150 during which the data processing system 105 may respond to the request with a query, such as "Which application would you like to use?" or provide options from which a user can select an application, such as "Please select a ride sharing service provider from: Company A, Company B, or Company C." Thus, by asking the user to select the ride sharing company or requesting additional information, the data processing system 105 can facilitate the digital component or application selection process that is to occur at ACT 508. For example, the data processing system 105 can determine, based on the initial request, that there are an excessive number of different applications or digital components that can be deemed to be responsive to the request. The data processing system 105, responsive to determining that there are greater than a threshold number of responses to the request (e.g., 5, 10, 15, 20 or more), can generate a follow-up query to transmit to the client computing device 150. The data processing system 105 can receive a response to this follow-up query, and use the response to filter the set of possible digital components or applications down to one or other predetermined number (e.g., 2, 3, 4, 5, 6, or 7) of digital components or applications. The data processing system 105 can present this list of candidate digital components or application to the user to allow the user to select an application to use to perform the desired operation.

At ACT 510, the data processing system 105 can request information from the client computing device 150. The data processing system 105 can communicate with the client computing device 150 to obtain client computing device information. The data processing system 105 can request device information. In some cases, the data processing system 105 may not request information from the client computing device 150. The data processing system 105 can request device information prior to the selection process at ACT 508, or in parallel with the selection process at ACT 508. The data processing system 105 can request device information prior to identifying the request at ACT 506, or in parallel to identifying the request at ACT 506. The data processing system 105, in some cases, may already contain device information stored in memory of the data processing system 105 (e.g., device information for the client computing device 150 can be stored in data repository 145). In some cases, the client computing device 150, or local digital assistant executing on the client computing device 150, can provide the device information along with the data packets transmitted at ACT 504. In some cases, the client computing device 150 can provide the device information to the data processing system 105 without receiving a request from the data processing system 105 for device information.

The device information can include, for example, device type, device characteristics, geographic location, memory availability, processor availability, operating system, installed application, available input interfaces, available output interfaces, make and model of the computing device 150, or version of the operating system. The device information can include digital components or applications installed or available to the client computing device 150 or account associated with the client computing device 150. For example, the data processing system 105 can select an application at ACT 508, and then query the client computing device 150 at ACT 510 to determine whether the selected application is installed on the client computing device 150. The client computing device 150 can respond with an indication as to whether or not the application is installed on the client computing device.

For example, the client computing device 150 can query an application registry or list of installed application stored in memory of the client computing device 150. The client computing device 150 can perform a lookup in the application registry, list, or other data structure or data file on the client computing device 150 storing information about installed application. In some cases, the data processing system 150 can store the registry, list, or other data structure or data file in memory or other storage on the data processing system 105 (e.g., in data repository 145).

The response to the query of whether the application is installed on the client computing device can be an indication that the application is installed, or an indication that the application is not installed. For example, the response can be a null command that can indicate the queried application is not installed or available on the client computing device 150. The request can be a request to access a resource (e.g., the selected application or digital component) for the client computing device 150. The client computing device 150 or data processing system 105 can perform a lookup in a data structure, application registry, database or other data set to determine whether the application is available (e.g., installed on the client computing device 150 or other available to execute on the client computing device 150). Responsive to the lookup or query, the data processing system 105 can determine that the application is not installed or not available for the client computing device 150. The data processing system can receive a null command or other indication that the application is not installed or not available for the client computing device.

The application may be installed on the client computing device 150, but not available for use or to perform the operation corresponding to the request. For example, the application may be installed, but may consume excessive processor, memory or battery resources that are not available on the client computing device 150. In another example, the resource (e.g., application or digital component) can include a subscription based resource, and the subscription may have expired for the client computing device 150, thereby rendering the application not available for the client computing device 150. In yet another example, the resource (e.g., application) may be installed on the client computing device 150, but the version of the resource may be outdated or no longer compatible with the version of a server-side application executing on the service provider device 160 or data processing system 105, thereby rendering the installed version of the application incompatible and non-operational with the service provider device 160 or data processing system 105 to perform the requested operation.

Thus, at ACT 512, the data processing system 105 can determine whether the selected application is available for the client computing device 105. The data processing system 105 can determine if the selected application is available based on queries, lookups or parsing device information received at ACT 510. If the data processing system 105 determines, at ACT 512, that the application is available to perform the requested operation, then the data processing system 105 can invoke the application at ACT 514. The data processing system 105 can invoke a full or whole version of the application at ACT 514. The full or whole version of the application can refer to executing a full binary of the application on the client computing device 150. At ACT 514, the data processing system 105 can transmit an instruction or command, via network 165, to client computing device 150 to launch, initiate, invoke, or otherwise execute the selected application 518 on the client computing device 150.

The data processing system 105 can determine, at ACT 512 (e.g., decision block), that the application is not available for the client computing device 150. Responsive to determining that the application is not available for the client computing device 150, the data processing system 105 can determine to invoke, execute, or otherwise provide a partial version of the application 518. The partial version can refer to a web-based version of the application (e.g., a webview) or partial version of the application with limited features or functionality. The providing the partial version of the application can consume fewer computational resources as compared to downloading the full binary of the full version of the application on the client computing device 150, thereby reducing storage utilization on the client computing device 150, network bandwidth utilization (e.g., by not transmitting the full binary), or processor utilization (e.g., by not having to install the full application and then execute the full application). Furthermore, the data processing system 105 can select the partial version of the application comprising the limited set of features that are tailored to facilitate performance of the operation corresponding to the request.

Thus, the data processing system 105 can, at ACT 508, select, via a lookup in an application database and from a plurality of applications an application 518 corresponding to the request, and then, at ACT 512, determine that the application is absent from the client computing device 150. The data processing system 105 at ACT 516 can invoke or provide a partial version of the application 518 via the client computing device 150.

At ACT 520, the data processing system 105 can determine whether login credentials are available for the selected application 518. The data processing system 105 can determine whether the application is already logged in. Login information can refer to or include information used to authenticate or authorize the application, as well as information used to execute an electronic transaction (e.g., username, password, unique identifier, payment information, or account information). When, at ACT 520, the data processing system 105 determines that the login information is available, the data processing system 105 can exit 522 the decision process because the application 518 or data processing system 105 can use the available login information facilitate the requested operation. Exit 522 can refer to terminating the process prior to generation of the token, and, instead, indicating to the application 518 to proceed using the available login information.

The data processing system 105 can determine that the login information or account information is not available. The data processing system 105 determine an absence of the device identifier corresponding to the client computing device 150 in a database storing account identifiers. The account identifiers can be associated with a service provider device 160 or the selected application 118. For example, the database can include a list of all device identifiers for which the selected application 518 is provisioned or authorized. If the device identifier of the client computing device 150 is not stored in the database storing account identifiers for the selected application 518, then the data processing system 105 can determine that no account identifier for the selected application 518 is available for the client computing device 150 having the device identifier. The data processing system 105 can perform a lookup or otherwise query the database using the device identifier of the client computing device 150 (which the data processing system 105 can receive at ACT 510 or a previous ACT), and receive the null command responsive to the lookup, thereby indicating the absence of the device identifier in the database, which can further indicate that login information or an account identifier is not available for the selected application 518 for the client computing device 150.

When, however, the data processing system 105 determines at ACT 520 that the login information is not available, the data processing system 105 can generate a token at ACT 524. The token can take the place of or replace the login information. The token can be used by the application 518 or service provider device 160 to perform the operation in lieu of the login information. The data processing system 105 can generate the token responsive to a null command or other indication that the login information is not available that is responsive to a query or lookup for the login information for the selected application 518. For example, the data processing system 105 can perform a lookup or query for login information for the selected application 518, and then receive, in response to the query, a null command or other indication that the login information or credentials are not available. The data processing system can perform a lookup with the device identifier in a database storing account identifiers (e.g., login information) established for the service provider device 160 corresponding to the selected resource, and receive the null command responsive to the lookup.

The data processing system 105 can determine that the login is not available at ACT 520 based on whether or not the selected application 518 is logged in. For example, the selected application 518 can be fully installed on the client computing device 150 and the data processing system 105 can invoke the full application at ACT 514. However, the selected application 518, upon launch, may not have access to login information. To login, the user of the client computing device 150 may have to input login credentials or otherwise perform authentication. The data processing system 105 can determine that the application 518 is logged out, and then determine to bypass by the login screen or authentication procedure. The data processing system 105 can bypass the login screen or authentication procedures by generating or using a token. Thus, the data processing system 105 can determine that even though the application is installed and invoked (e.g., ACTS 512 and 514), that login information is not available (e.g., ACTS 520 and 524), and generate a token. Generating a token instead of requesting the user to login or enter an authentication process can reduce the number of remote procedure calls, or reduce delay in performance of the requested operation because the application 518 or data processing system 105 may not have to prompt the user for any login input, perform an authentication process with the provider of the application, or reject erroneous login credentials and request a password reset or other countermeasures. The data processing system 105, therefore, can reduce delay, calls, and improve user experience and the user interface by bypassing the login or authentication process by automatically generating a token for the session.

Responsive to the null command or otherwise determining that login information (e.g., account information) for the selected application 118 is not available for the client computing device 150 (e.g., based on a device identifier for the client computing device 150), the data processing system 105 can generate a token using one or more token generation techniques. The data processing system 105 can generate the token using a hash function. The data processing system 105 can generate the token based on a random identifier. The data processing system 105 can generate the token to be or include a virtual identifier. The token can refer to or include a virtual identifier. The data processing system 105 can generate the token or virtual identifier using at least one of a hash function or a cryptographic function. The data processing system 105 can generate the token to include or be a virtual identifier that includes a digital certificate.

The data processing system 105 can generate the token based on the device identifier, a session identifier, and an application identifier of the application. The data processing system 105 can obtain the session identifier from the session handler 140 of the data processing system 105. The session identifier can refer to a unique session indicator, such as a date and timestamp, counter value, random number, or hash value generated based on a n-tuple of one or more values (e.g., date, time, random number, counter value). The data processing system 105 can input the values (e.g., device identifier, session identifier, application identifier) into a hash function to generate the token. In some cases, the data processing system 105 can generate the token by combining the values, appending one value to another value, summing the values, or otherwise combining the values.

Upon generating the token, the data processing system 105 can associate the token to device information using a one-to-one mapping. The data processing system 105 can generate an index mapping the token to the device information. The data processing system 105 can generate an index mapping the token to payment information. The data processing system 105 can generate a one-to-one mapping of the token to device information and payment information.

For example, the data processing system 105 can store, in a data processing system 145, an index that includes the device identifier of the computing device 150. The device identifier can be associated with account information used by the data processing system 105. This account information can be further established with payment information and other profile information associated with the device identifier or computing device 150 or user of the computing device 150. However, this account information or profile information may not be previously linked or associated with the selected application 518 or service provider device 160. Thus, the data processing system 105 can link the generated token with the payment information, profile information, or other device information to facilitate the performance of the requested operation by the service provider device 160. The data processing system 105 can generate a temporary link between the token and the payment information (or other profile information). The data processing system 105 can terminate or remove the link responsive to a termination event (e.g., time period, instruction, or indication that the requested operation has been performed or is complete).

The data processing system 105 can transmit the token to the client computing device 150 or application 518 at ACT 524. The client computing device 150 can input or provide the token to the application 518 (e.g., full version or partial version of application 518). The application 518 can receive the token, and then transmit a request along with the token to the service provider device 160 at ACT 526. The application 518 can embed the token with the request. The application 518 can generate one or more data packets with the request, the token, and additional information that can facilitate the performance of the operation (e.g., location information, or user input received via a user interface of the application 518).

The data processing system 105 can route data packets having the token to a service provider device 160 to cause the service provider device to process the data packets. The data packets can be routed from the client computing device 150 to the service provider device 160 via the data processing system 105, or directly routed from the client computing device 150 to the service provider device 160 via network 165. Routing the data packets can include, for example, the data processing system 105 instructing or causing the client computing device 150 to route the packets through network 165 to service provider device 160.

The service provider device 160 can use the token to bypass login credentials and authentication. For example, the service provider 160 may require payment information or authentication or login information to perform the operation. At ACT 528, the service provider device 160 can request the payment information from the data processing system 105. The data processing system 105 can perform a lookup in an index or other token repository that maps or links the token to the device identifier or corresponding payment information. The data processing system 105 can provide the device information or payment information to the service provider device 160 to perform the operation. Thus, the client computing device 150 may not need to establish an account or payment information or otherwise configure the application 518 because the data processing system 105 can provide information linked to the generated token directly to the service provider device 160.

The data processing system 105 may not send certain information to the service provider device 160. The data processing system 105 may only send the information used to perform the operation. The data processing system 105, for example, can send client computing device information or device information (e.g., location information) to the service provider device 160, but not send the device identifier itself, which may be a unique identifier (e.g., a username) that can identify the user of the client computing device 150. Thus, the data processing system 105 can use the token to maintain security or anonymity with respect to the service provider device 160. Similarly, the data processing system 105 can generate a token for the payment information to provide payment to the service provider device 160 without forwarding the actual payment account information.

At ACT 530, the service provider device 160 can perform the operation corresponding to the request (e.g., provide the ride sharing service, restauration reservation, purchase movie tickets or other items). At ACT 532, the service provider device 160 can transmit a response to the client computing device 150 that is responsive to the request at ACT 526. The response can include status information or updates that can be displayed or presented or otherwise provided via application 518. The data processing system 105 can also receive, from the service provider device 160, an indication that the service provider device 160 processed, via the token, the data packets to perform an operation.

The data processing system 105 can receive additional requests based on additional input audio signals. For example, the data processing system 105 can determine for another input audio signal, a new request (e.g., a second request or third request). The data processing system 105 can determine, for the new request, that the device identifier of the client computing device is present in a second database corresponding to an application installed on the client computing device. The data processing system 105 can identify, based on the request, the application installed on the client computing device 150. The data processing system 105, however, can determine that the application is logged out (e.g., ACT 520). The data processing system 105 can generate the token responsive to the determination that the device identifier is present in the second database, but the application is logged out.

Figure 6:
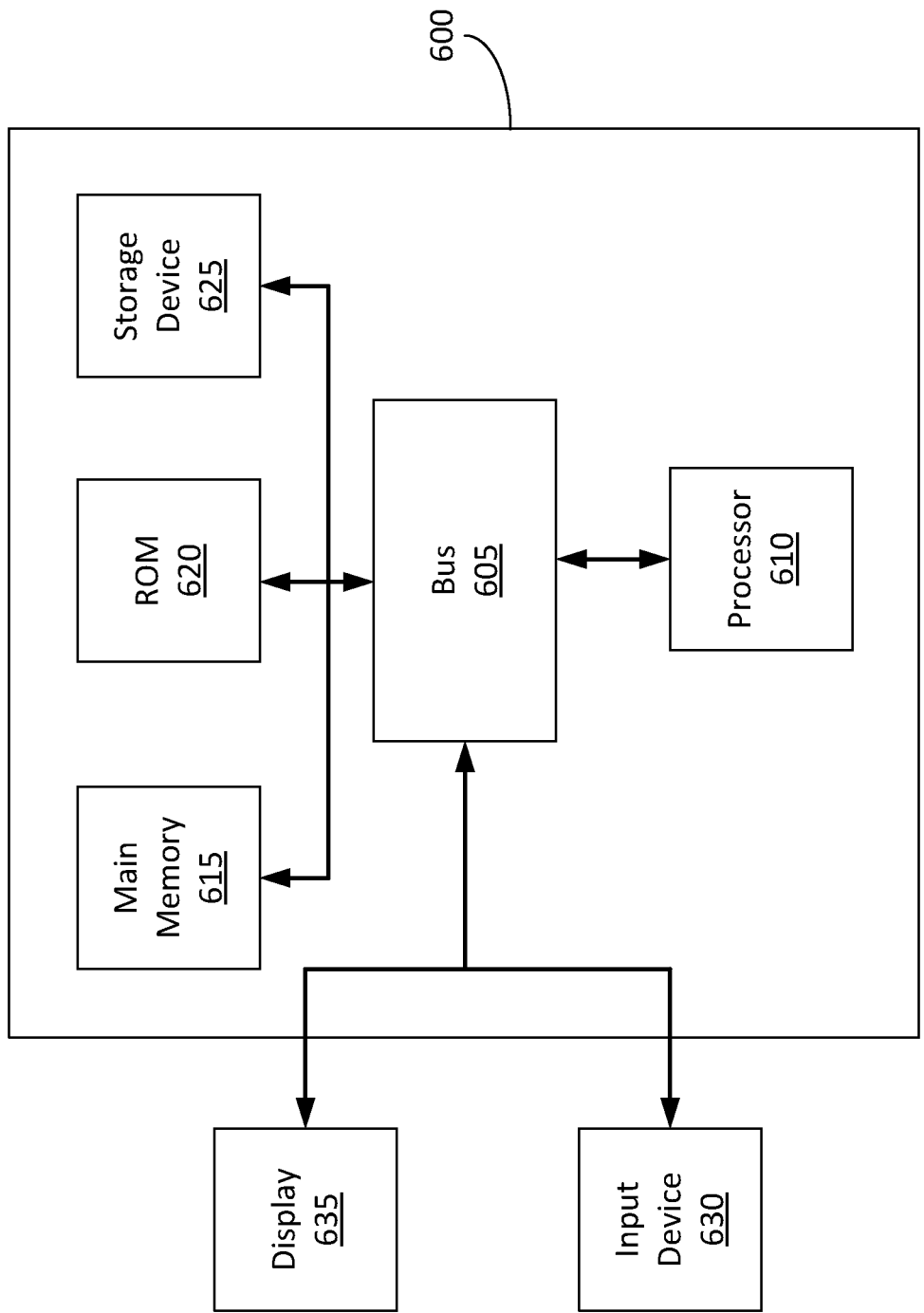
FIG. 6 is a block diagram illustrating a general architecture for a computer system that may be employed to implement elements of the systems and methods described and illustrated herein.

FIG. 6 is a block diagram of an example computer system 600. The computer system or computing device 600 can include or be used to implement the system 100, or its components such as the data processing system 105. The data processing system 105 can include an intelligent personal assistant or voice-based digital assistant. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 610. The main memory 615 can be or include the data repository 145. The main memory 615 can also be used for storing position information, temporary variables, or other intermediate information during execution of instructions by the processor 610. The computing system 600 can further include a read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the data repository 145.

The computing system 600 can be coupled via the bus 605 to a display 635, such as a liquid crystal display, or active matrix display, for displaying information to a user. An input device 630, such as a keyboard including alphanumeric and other keys, can be coupled to the bus 605 for communicating information and command selections to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the data processing system 105, the client computing device 150 or other component of FIG. 1, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement can also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 135, content selector component 125, link generation component 120 or NLP component 110 and other data processing system 105 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 600 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 105 from the client computing device 150 or the content provider computing device 155 or the service provider device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110, the content selector component 125, or the link generation component 120 can be a single component, app, or program, or a logic device having one or more processing circuits, or part of one or more servers of the data processing system 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to provide network communications between devices to process an operation, comprising:
   a natural language processor component executed by a data processing system to receive, via an interface of the data processing system, data packets comprising an input audio signal detected by a sensor of a client computing device having a device identifier;
   the natural language processor component to parse the input audio signal to identify a request and one or more keywords corresponding to the request;
   a content selector component executed by the data processing system to receive the one or more keywords identified by the natural language processor component and to select, based on the one or more keywords, a digital component via a real-time content selection process, the digital component associated with a third-party content provider;
   the natural language processor component to receive a second request to access a resource associated with the digital component;
   a link generation component to:
   receive a null command responsive to the second request to access the resource associated with the digital component for the client computing device, the null command indicating an absence of the device identifier in a database storing account identifiers;

generate, responsive to the null command, a virtual identifier to represent the client computing device; and route data packets based on the request with the virtual identifier to a service provider device to cause the service provider device to process the data packets based on the request to provide access to the resource associated with the digital component using the virtual identifier; and the data processing system to receive, from the service provider device, an indication that the service provider device processed, via the virtual identifier, the data packets to perform an operation responsive to the request to provide access to the resource associated with the digital component.

2. The system of claim 1, comprising the data processing system to:

perform a lookup with the device identifier in the database storing account identifiers established for the service provider device corresponding to the digital component; and receive the null command responsive to the lookup.

3. The system of claim 1, comprising the data processing system to determine the absence of the device identifier in the database storing account identifiers based on the null command.

4. The system of claim 1, wherein the resource comprises an application, comprising the data processing system to:

identify, based on the request to access the resource, the application installed on the client computing device;

determine that the application is logged out; and generate the virtual identifier responsive to the application being logged out.

5. The system of claim 1, comprising the data processing system to:

identify, based on the request, an application installed on the client computing device to perform at least a portion of the operation;

determine that the application is logged out;

generate the virtual identifier responsive to the application being logged out; and provide the virtual identifier to the application to cause the application to bypass a login screen.

6. The system of claim 1, comprising:

the data processing system to generate the virtual identifier for the client computing device responsive to the absence of the device identifier in the database storing account identifiers associated with the service provider device.

7. The system of claim 1, comprising the data processing system to:

determine, for a third request, that the device identifier is present in a second database corresponding to an application installed on the client computing device;

identify, based on the request, the application installed on the client computing device;

determine that the application is logged out; and generate the virtual identifier responsive to the determination that the device identifier is present in the second database and the application is logged out.

8. The system of claim 1, comprising the data processing system to:

identify, based on the request, an application installed on the client computing device configured to perform at least a portion of the operation; and generate the virtual identifier based on the device identifier, a session identifier, and an application identifier of the application.

9. The system of claim 1, comprising the data processing system to:

select, via a lookup in an application database and from a plurality of applications, an application corresponding to the request;

identify a deeplink for the application; and cause the application to execute at least partially on the client computing device.

10. The system of claim 1, comprising the data processing system to:

select, via a lookup in an application database and from a plurality of applications, an application corresponding to the request;

determine that the application is absent from the client computing device; and provide a partial version of the application via the client computing device.

11. The system of claim 1, comprising:

the data processing system to send client computing device information to the service provider device, wherein the client computing device information is distinct from the device identifier.

12. The system of claim 1, comprising:

the data processing system to communicate with the client computing device to obtain client computing device information.

13. The system of claim 1, comprising:

the data processing system to generate the virtual identifier using at least one of a hash function and a cryptographic function.

14. The system of claim 1, comprising:

the data processing system to generate the virtual identifier including a digital certificate.

15. A method of providing network communications between devices to process an operation, comprising:

receiving, by a natural language processor component executed by a data processing system comprising one or more processors, data packets comprising an input audio signal detected by a sensor of a client computing device having a device identifier;

parsing, by the data processing system, the input audio signal to identify a request and one or more keywords corresponding to the request;

receiving, by a content selector component executed by the data processing system, the one or more keywords identified by the natural language processor component;

selecting, by the data processing system based on the one or more keywords, a digital component via a real-time content selection process, the digital component associated with a third-party content provider;

receiving, by the data processing system, a second request to access a resource associated with the digital component receiving, by the data processing system, a null command responsive to the second request to access the resource associated with the digital component for the client computing device, the null command indicating an absence of the device identifier in a database storing account identifiers;

generating, by the data processing system responsive to the null command, a virtual identifier to represent the client computing device; and routing, by the data processing system, based on the request with the virtual identifier to a service provider device to cause the service provider device to process the data packets based on the request to provide access to the resource associated with the digital component using the virtual identifier;

receiving, by the data processing system to from the service provider device, an indication that the service provider device processed, via the virtual identifier, the data packets to perform an operation responsive to the request to provide access to the resource associated with the digital component.

16. The method of claim 15, comprising:
determining, by the data processing system, the absence of the device identifier in the database storing account identifiers based on the null command.

17. The method of claim 15, wherein the resource comprises an application, the method comprising:
identifying, by the data processing system based on the request to access the resource, the application installed on the client computing device;
determining, by the data processing system, that the application is logged out; and
generating, by the data processing system, the virtual identifier responsive to the application being logged out.

18. The method of claim 15, comprising:
identifying, by the data processing system based on the request, an application installed on the client computing device to perform at least a portion of the operation;
determining, by the data processing system, that the application is logged out;
generating, by the data processing system, the virtual identifier responsive to the application being logged out; and
providing, by the data processing system, the virtual identifier to the application to cause the application to bypass a login screen.

19. The method of claim 15, comprising:
identifying, by the data processing system based on the request, an application installed on the client computing device configured to perform at least a portion of the operation; and
generating, by the data processing system, the virtual identifier based on the device identifier, a session identifier, and an application identifier of the application.

20. The method of claim 15, comprising:
selecting, by the data processing system via a lookup in an application database and from a plurality of applications, an application corresponding to the request;
determining, by the data processing system, that the application is absent from the client computing device; and
providing, by the data processing system, a partial version of the application via the client computing device.

* * * * *